United States Patent [19]
Ohki

[11] Patent Number: 6,006,246
[45] Date of Patent: *Dec. 21, 1999

[54] METHOD OF AND APPARATUS FOR MULTIPLYING MATRIX DATA

[75] Inventor: Mitsuharu Ohki, Tokyo, Japan

[73] Assignee: Sony Corporation, Japan

[*] Notice: This patent is subject to a terminal disclaimer.

[21] Appl. No.: 09/197,508

[22] Filed: Nov. 23, 1998

Related U.S. Application Data

[63] Continuation of application No. 08/150,371, Nov. 10, 1993, Pat. No. 5,933,361.

[30] Foreign Application Priority Data

Nov. 13, 1992 [JP] Japan .................................. 4-304028

[51] Int. Cl.$^6$ .................................................. G06F 17/16
[52] U.S. Cl. ........................................ 708/607; 708/410
[58] Field of Search ..................................... 708/607, 410

[56] References Cited

U.S. PATENT DOCUMENTS

| | | | |
|---|---|---|---|
| 4,134,134 | 1/1979 | Lux | 708/400 |
| 4,621,337 | 11/1986 | Cates et al. | 708/410 |
| 4,839,844 | 6/1989 | Watari | 708/410 |
| 5,001,663 | 3/1991 | Parulski et al. | 708/607 |
| 5,008,848 | 4/1991 | Akiwumi-Assani | 708/400 |

*Primary Examiner*—David H. Malzahn
*Attorney, Agent, or Firm*—Rader, Fishman & Grauer; Ronald P. Kananen

[57] ABSTRACT

A constant matrix [TS] is resolved into three constant matrices [TSC], [TSB], [TSA]. 1st~16th rows of the constant matrix [TSC] are calculated by a first stage of additions/subtractions (adders/subtractors $1_1$~$1_{16}$) to which elements A1~A16 are inputted. 1st~16th rows of the constant matrix [TSB] are calculated by a second stage of additions/subtractions (adders/subtractors $2_1$~$2_{16}$) to which outputs from the first stage of additions/subtractions are inputted in a predetermined pattern as shown. 1st~16th rows of the constant matrix [TSA] are calculated by a third stage of additions/subtractions (adders/subtractors $3_1$~$3_{16}$) to which outputs from the second stage of additions/subtractions are inputted in a predetermined pattern as shown. As a result, 1st~16th rows of the constant matrix [TS] are calculated by the first through third stages of additions/subtractions, outputting elements B1~B16. The amount of computation required to calculate the matrices is reduced.

11 Claims, 21 Drawing Sheets

```
++00
+-00
00++
00+-
    +0ii
    +0jj
    0-ij
    0+ij
        kkll
        nnkk
        kmln
        nlkm
            kkll
            nnkk
            kmln
            nlkm
                acbh
                fadg
                ghab
                dbga
                    ahcb
                    fgad
                    gbha
                    dabg
                        adcb
                        fcad
                        gfha
                        hafc
                            acbh
                            fadg
                            ghab
                            dbga
                                acbh
                                fadg
                                ghab
                                dbga
                                    ahcb
                                    fgad
                                    gbha
                                    dabg
                                        adcb
                                        fcad
                                        gfha
                                        hafc
                                            acbh
                                            fadg
                                            ghab
                                            dbga
                                                +ikn
                                                +jlk
                                                +jnm
                                                +iml
                                                    +ikl
                                                    -ink
                                                    -ilm
                                                    -jkl
                                                        +ikl
                                                        -ink
                                                        +jnk
                                                        +imn
                                                            +jkl
                                                            -jnk
                                                            +ink
                                                            -ikl
```

$$[X_C] \equiv \begin{Bmatrix} x_{11} \\ x_{21} \\ x_{31} \\ \vdots \\ x_{81} \\ x_{12} \\ x_{22} \\ \vdots \\ x_{78} \\ x_{88} \end{Bmatrix} \qquad [Y_C] \equiv \begin{Bmatrix} y_{11} \\ y_{21} \\ y_{31} \\ \vdots \\ y_{81} \\ y_{12} \\ y_{22} \\ \vdots \\ y_{78} \\ y_{88} \end{Bmatrix}$$

METHOD OF AND APPARATUS FOR MULTIPLYING MATRIX DATA

This application is a continuation of application Ser. No. 08/150,371 filed Nov. 10, 1993, entitled METHOD OF AND APPARATUS FOR MULTIPLYING MATRIX DATA now U.S. Pat. No. 5,933,361.

BACKGROUND OF THE INVENTION

1. Field of the Invention

The present invention relates to a method of and an apparatus for multiplying matrix data in discrete cosine transform (DCT) or inverse discrete cosine transform (IDCT) for use in the compression of image data or the like.

2. Description of the Prior Art

It has been proposed by the inventor of the present application to reduce the amount of matrix computation for a two-dimensional 8×8 DCT and a two-dimensional 8×8 IDCT through a suitable matrix resolution, in U.S. Ser. No. 020,313 filed Feb. 19, 1993 on apparatus for discrete cosine transform and apparatus for inverse discrete cosine transform.

More specifically, a two-dimensional 8×8 DCT is a transform from the 64 elements of an 8×8 matrix in a real space into the 64 elements of an 8×8 matrix in a frequency space. If it is assumed that the 64 elements of the 8×8 matrix in the real space are regarded as a vertical vector (a vector composed of 64 elements: Xc) and the 64 elements of the 8×8 matrix in the frequency space are also regarded as a vertical vector (a vector composed of 64 elements: Yc), then the two-dimensional 8×8 DCT becomes a linear transform from the vector Xc into the vector Yc.

Thus, $$[Yc]=[M][Xc]$$

where [M] is a 64×64 constant matrix.

In the above earlier application, it has been proposed to reduce the amount of computation based on the fact that the 64×64 constant matrix [M] can be resolved into:

$$[M]=[W][V][TS][R][L][Q]/8$$

where [Q], [L], [R], [TS], [V], and [W] are 64×64 constant matrices, respectively. The details of these matrices are shown in FIGS. 1 through 6 of the accompanying drawings.

Figure 1:
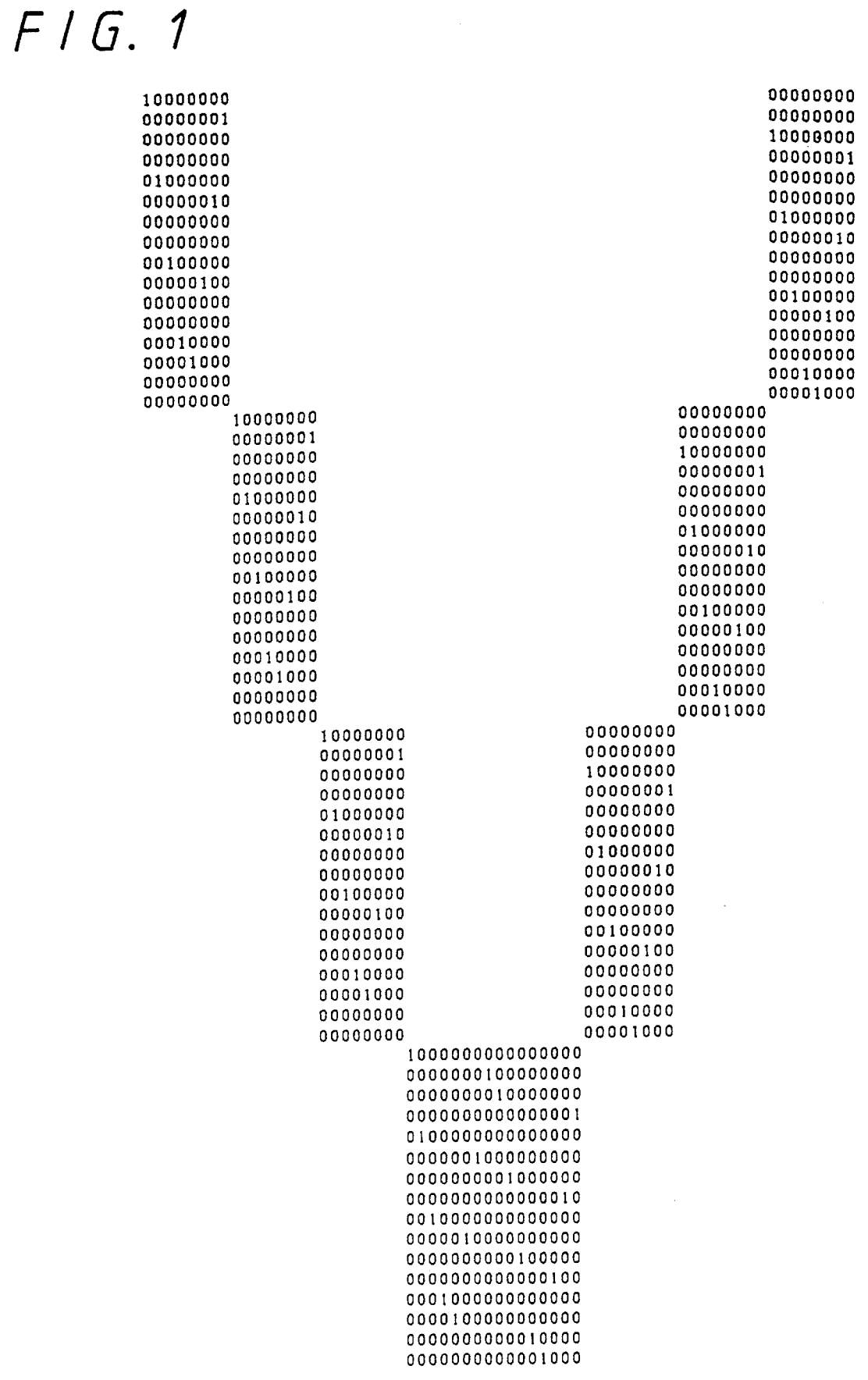

FIG. 1 shows the elements of the 64×64 constant matrix [Q]. FIG. 2 shows the elements of the 64×64 constant matrix [L]. FIG. 3 shows the elements of the 64×64 constant matrix [R]. FIG. 4 shows the elements of the 64×64 constant matrix [TS]. FIG. 5 shows the elements of the 64×64 constant matrix [V]. FIG. 6 shows the elements of the 64×64 constant matrix [W].

In FIGS. 1 through 6, the blanks represent 0, the symbol + represents +1, the symbol − represents −1, and the alphabetical letters are defined as follows:

$$a=-e=\cos(\pi/16)$$

$$b=-f=\cos(3\pi/16)$$

$$c=-g=\cos(5\pi/16)$$

$$d=-h=\cos(7\pi/16)$$

$$i=-j=\cos(4\pi/16)$$

$$k=-m=\cos(2\pi/16)$$

$$l=-n=\cos(6\pi/16).$$

While the blanks represent 0, some 0s that are required to give an easier understanding of the position of +1 and −1 are illustrated.

Specifically, in the above earlier application, a permutation circuit calculates the constant matrix [Q], a four-order inner product calculating circuit with coefficients +1 and −1 calculates the constant matrix [L], a permutation circuit calculates the constant matrix [R], an eight-order inner product calculating circuit with coefficients 0, +1, and −1 calculates the constant matrix [TS], a four-order inner product calculating circuit calculates the constant matrix [V], and a permutation circuit calculates the constant matrix [W]. These circuits make up a circuit arrangement for computing a two-dimensional 8×8 DCT.

Such a circuit arrangement is shown in FIG. 7 of the accompanying drawings. In FIG. 7, data in eight rows and eight columns are inputted as the vector [Xc] shown in FIG. 8 of the accompanying drawings in the order of columns from an input terminal IN, and supplied through a first 64-word permutation circuit 41 to a first four-order inner product calculating circuit 42. The first four-order inner product calculating circuit 42 supplies an output signal through a second 64-word permutation circuit 43 to a second eight-degree inner product calculating circuit 44. The second eight-order inner product calculating circuit 44 supplies an output signal to a third four-order inner product calculating circuit 45, whose output signal is supplied through a third 64-word permutation circuit 46 to an output terminal OUT.

The first inner product calculating circuit 42 has only coefficients +1 and −1, and the second inner product calculating circuit 44 has only coefficients 0, +1, and −1. The third inner product calculating circuit 45 has coefficients whose values are inherent in DCT.

A two-dimensional 8×8 IDCT is a transform from the 64 elements of an 8×8 matrix in a frequency space into the 64 elements of an 8×8 matrix in a real space. If it is assumed that the 64 elements of the 8×8 matrix in the frequency space are regarded as a vertical vector (a vector composed of 64 elements: Yc) and the 64 elements of the 8×8 matrix in the real space are also regarded as a vertical vector (a vector composed of 64 elements: Xc), then the two-dimensional 8×8 IDCT becomes a linear transform from the vector Yc into the vector Xc.

Thus, $$[Xc]=[IM][Yc]$$

where [IM] is a 64×64 constant matrix.

In the above earlier application, it has been proposed to reduce the amount of computation based on the fact that the 64×64 constant matrix [IM] can be resolved into:

$$[IM]=t[Q]t[L]t[R]t[TS]t[V]t[W]/8$$

where t [Q] is a transposed matrix of the 64×64 constant matrix [Q], t [R] is a transposed matrix of the 64×64 constant matrix [R], t [TS] is a transposed matrix of the 64×64 constant matrix [TS], t [V] is a transposed matrix of the 64×64 constant matrix [V], and t [W] is a transposed matrix of the 64×64 constant matrix [W].

Specifically, in the above earlier application, a permutation circuit calculates the constant matrix t [W], a four-order inner product calculating circuit calculates the constant matrix t [V], an eight-order inner product calculating circuit with coefficients 0, +1, and −1 calculates the constant matrix t [TS], a permutation circuit calculates the constant matrix t [R], a four-order inner product calculating circuit with coefficients +1 and −1 calculates the constant matrix t [L], and a permutation circuit calculates the constant matrix t [Q]. These circuits make up a circuit arrangement for computing a two-dimensional 8×8 IDCT.

Such a circuit arrangement is shown in FIG. 9 of the accompanying drawings. In FIG. 9, data in eight rows and eight columns from an input terminal IN are supplied through a fourth 64-word permutation circuit 71 to a fourth four-order inner product calculating circuit 72. The fourth four-order inner product calculating circuit 72 supplies an output signal to a fifth eight-order inner product calculating circuit 73. The fifth eight-order inner product calculating circuit 73 supplies an output signal through a fifth 64-word permutation circuit 74 to a sixth four-order inner product calculating circuit 75, whose output signal is supplied through a sixth 64-word permutation circuit 76 to an output terminal OUT.

The calculation of the constant matrix [TS] is a computation of:

$$\begin{pmatrix} B1 \\ B2 \\ B3 \\ \vdots \\ B64 \end{pmatrix} = [TS] \begin{pmatrix} A1 \\ A2 \\ A3 \\ \vdots \\ A64 \end{pmatrix} \quad (1)$$

from an inputted vertical vector [A] composed of 64 elements [A] to output a vertical vector [B] composed of 64 elements [Bi].

The above calculation is carried out in the eight-order inner product calculating circuit 44. Since the eight-order inner product calculation is effected on each of the 64 data items, it is necessary to carry out a total of 64×8=512 additions and subtractions.

The calculation of the constant matrix t [TS] is a computation of:

$$\begin{pmatrix} D1 \\ D2 \\ D3 \\ \vdots \\ D64 \end{pmatrix} = t[TS] \begin{pmatrix} C1 \\ C2 \\ C3 \\ \vdots \\ C64 \end{pmatrix} \quad (2)$$

from an inputted vertical vector [C] composed of 64 elements [Ci] to output a vertical vector [D] composed of 64 elements [Di].

The above calculation is carried out in the eight-order inner product calculating circuit 73. Since the eight-order inner product calculation is effected on each of the 64 data items, it is necessary to carry out a total of 64×8=512 additions and subtractions.

Furthermore, the calculation of the constant matrix [L] is a computation of:

$$\begin{pmatrix} F1 \\ F2 \\ F3 \\ \vdots \\ F64 \end{pmatrix} = [L] \begin{pmatrix} E1 \\ E2 \\ E3 \\ \vdots \\ E64 \end{pmatrix} \quad (3)$$

from an inputted vertical vector [E] composed of 64 elements [Ei] to output a vertical vector [F] composed of 64 elements [Fi].

The above calculation is carried out in the four-order inner product calculating circuit 42. Since the four-degree inner product calculation is effected on each of the 64 data items, it is necessary to carry out a total of 64×4=256 additions and subtractions.

The problems with the earlier application are that the amount of computation is excessively large for calculating each of the constant matrices [TS], t [TS], for example, as 512 additions and subtractions have to be made, and also the amount of computation is excessively large for calculating the constant matrix [L], for example, as 256 additions and subtractions have to be made,

SUMMARY OF THE INVENTION

It is an object of the present invention is to provide a method of and an apparatus for multiplying matrix data with a reduced amount of computation.

According to the present invention, there is provided a method of multiplying matrix data by inputting an input vector signal, calculating a constant matrix represented by the input vector signal and composed of elements having coefficients 0, +1, and −1, and outputting the result of the calculation as an output vector signal, the method comprising the steps of resolving the constant matrix into a plurality of matrices each composed of elements having coefficients 0, +1, and −1, and multiplying the matrices by way of additions and subtractions.

Inner products may be calculated by way of the additions and subtractions.

The input vector signal may comprise an image signal and may be linearly transformed with a constant matrix [M] by a DCT or an IDCT apparatus. The method may further comprise the steps of resolving the constant matrix [M] into constant matrices [W] [V] [TS] [R] [L] [Q], and resolving the constant matrix [TS] into a plurality of constant matrices [TSA], [TSB], [TSC] each composed of elements having coefficients 0, +1, and −1, or the steps of resolving the constant matrix [M] into constant matrices [W] [V] [TS] [R] [L] [Q], and resolving the constant matrix [L] into a plurality of constant matrices [LA], [LB] each composed of elements having coefficients 0, +1, and −1.

Each of the plurality of matrices may have two or less elements whose coefficients are not 0 in each row and each column.

There is also provided an apparatus for multiplying matrix data by inputting an input vector signal, calculating a constant matrix represented by the input vector signal and composed of elements having coefficients 0, +1, and −1, and outputting the result of the calculation as an output vector signal, the apparatus comprising a matrix calculating circuit for resolving the constant matrix into a plurality of matrices each composed of elements having coefficients 0, +1, and −1 and calculating each of the matrices, and an adding/subtracting circuit for multiplying the matrices by way of additions and subtractions.

The adding/subtracting circuit may comprise an inner product calculating circuit for calculating inner products by the way of the additions and subtractions.

The input vector signal may comprise an image signal and may be linearly transformed with a constant matrix [M] by a DCT or an IDCT apparatus, the matrix calculating circuit comprising a circuit for resolving the constant matrix [M] into constant matrices [W] [V] [TS] [R] [L] [Q] and calculating each of the constant matrices, and the adding/subtracting circuit comprising a circuit for resolving the constant matrix [TS] into a plurality of constant matrices [TSA], [TSB], [TSC] each composed of elements having coefficients 0, +1, and −1 and multiplying the constant matrices.

Alternatively, the input vector signal may comprise an image signal and may be linearly transformed with a constant matrix [M] by a DCT or an IDCT apparatus, the matrix calculating circuit comprising a circuit for resolving the constant matrix [M] into constant matrices [W] [V] [TS] [R] [L] [Q] and calculating each of the constant matrices, and the adding/subtracting circuit comprising a circuit for resolving the constant matrix [L] into a plurality of constant matrices [LA], [LB] each composed of elements having coefficients 0, +1, and −1 and multiplying the constant matrices.

Each of the plurality of matrices may have two or less elements whose coefficients are not 0 in each row and each column, the adding/subtracting circuit comprises a group of adders/subtractors having two inputs.

The circuit arrangement which resolves the 64×64 constant matrix [TS] into three matrices each composed of elements having coefficients 0, +1, and −1 and effects calculations on the elements of those matrices makes it is possible to reduce the amount of computation so as to be less than 512 additions/subtractions. The circuit arrangement which resolves the 64×64 constant matrix t [TS] into three matrices each composed of elements having coefficients 0, +1, and −1 and effects calculations on the elements of those matrices also makes it is possible to reduce the amount of computation so as to be less than 512 additions/subtractions. Furthermore, the circuit arrangement which resolves the 64×64 constant matrix [L] into two matrices each composed of elements having coefficients 0, +1, and −1 and effects calculations on the elements of those matrices makes it is possible to reduce the amount of computation so as to be less than 256 additions/subtractions.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a diagram of a constant matrix [Q] for calculating a two-dimensional 8×8 DCT;

Figure 3:
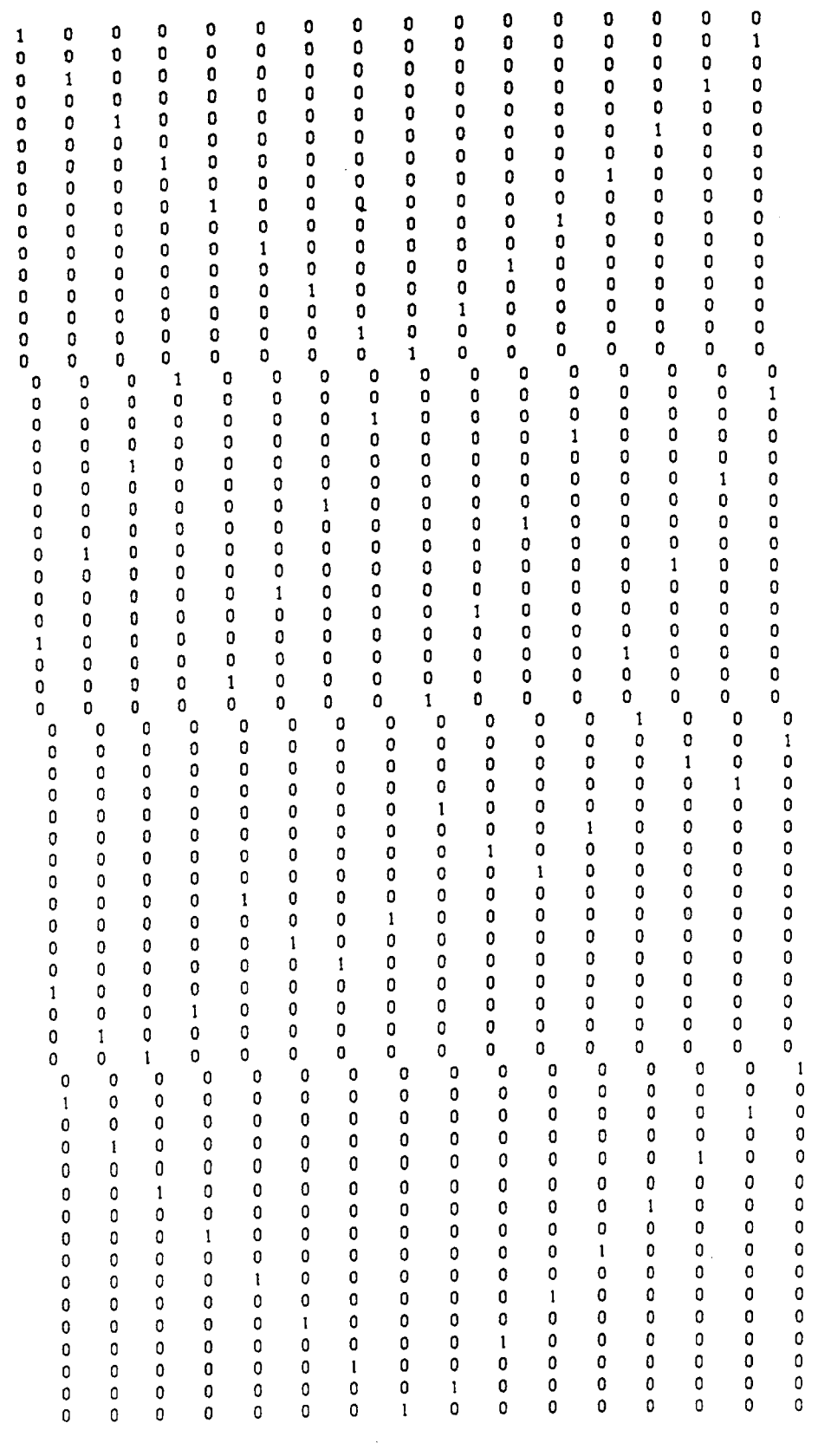

FIG. 3 is a diagram of a constant matrix [R] for calculating a two-dimensional 8×8 DCT;

FIG. 4 is a diagram of a constant matrix [TS] for calculating a two-dimensional 8×8 DCT;

FIG. 5 is a diagram of a constant matrix [V] for calculating a two-dimensional 8×8 DCT;

Figure 6:
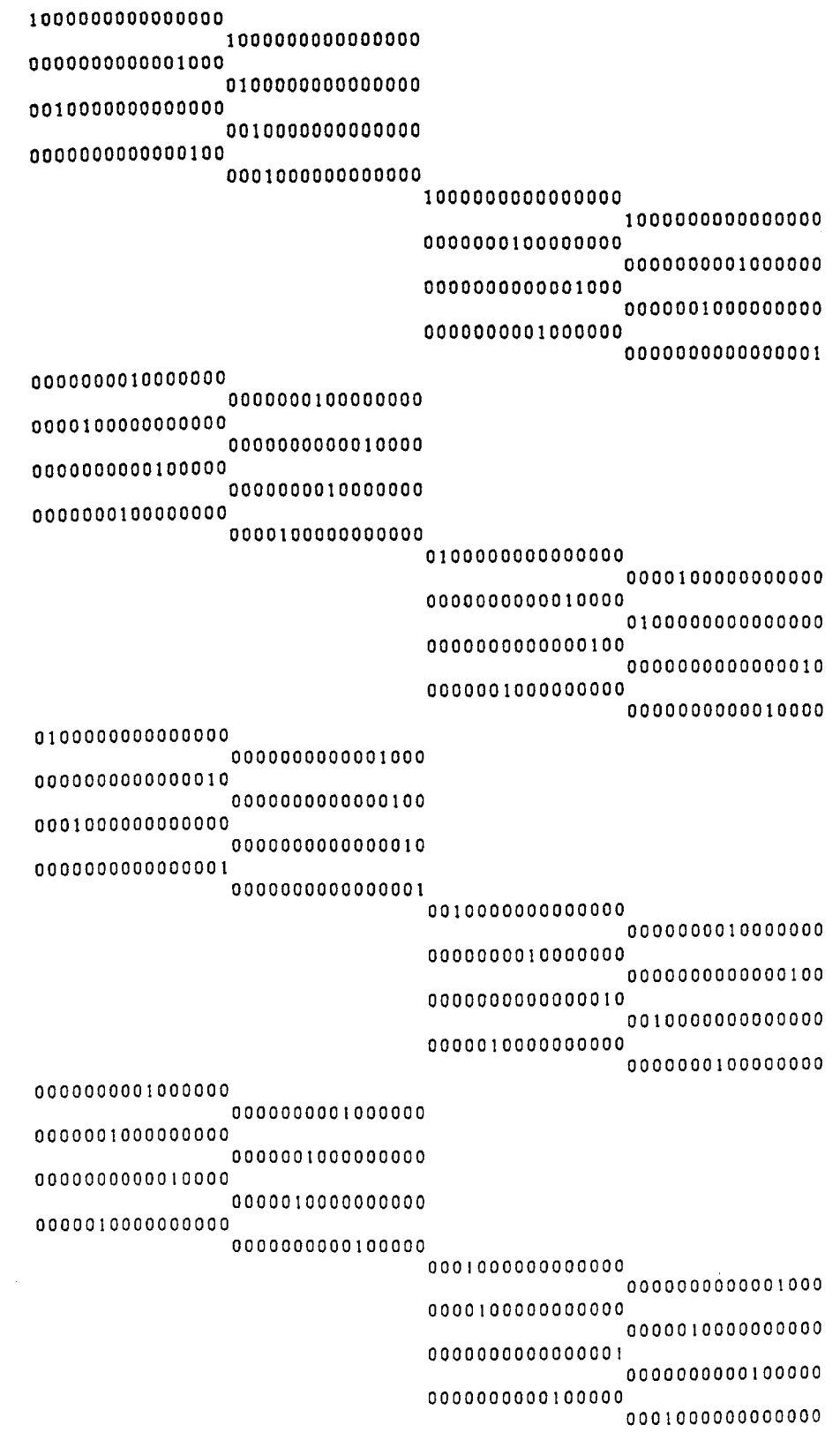

FIG. 6 is a diagram of a constant matrix [W] for calculating a two-dimensional 8×8 DCT;

FIG. 8 is a diagram showing vertical matrices;

FIG. 13 is a diagram illustrative of a constant matrix [TSC] employed in the description of the first embodiment;

FIG. 14 is a diagram illustrative of a constant matrix [TSB] employed in the description of the first embodiment;

FIG. 15 is a diagram illustrative of a constant matrix [TSA] employed in the description of the first embodiment;

FIG. 20 is a diagram illustrative of a constant matrix [LB] employed in the description of the third embodiment; and FIG. 21 is a diagram illustrative of a constant matrix [LA] employed in the description of the third embodiment.

DETAILED DESCRIPTION OF THE PREFERRED EMBODIMENTS

Figure 4:
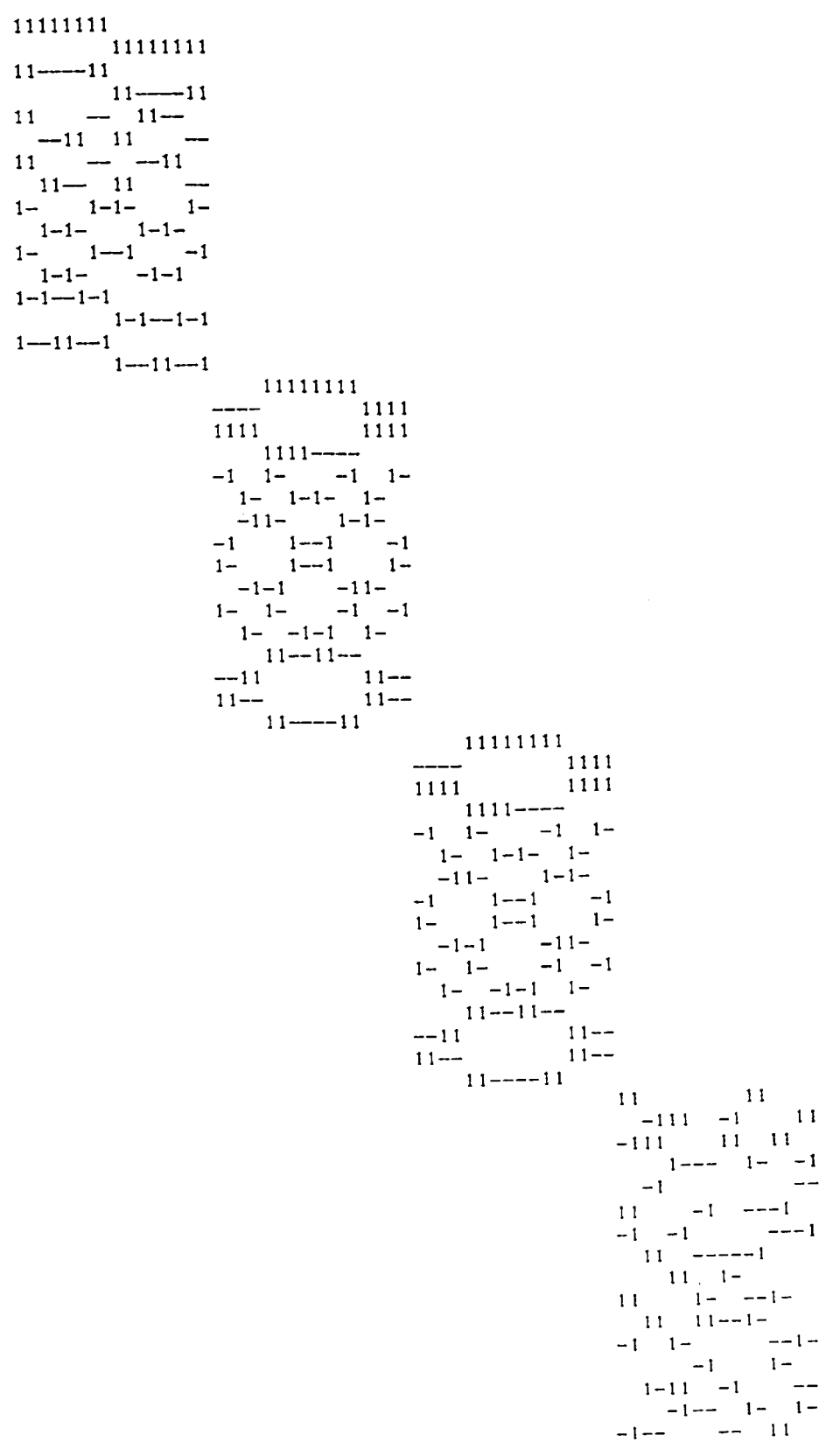
Figure 13:
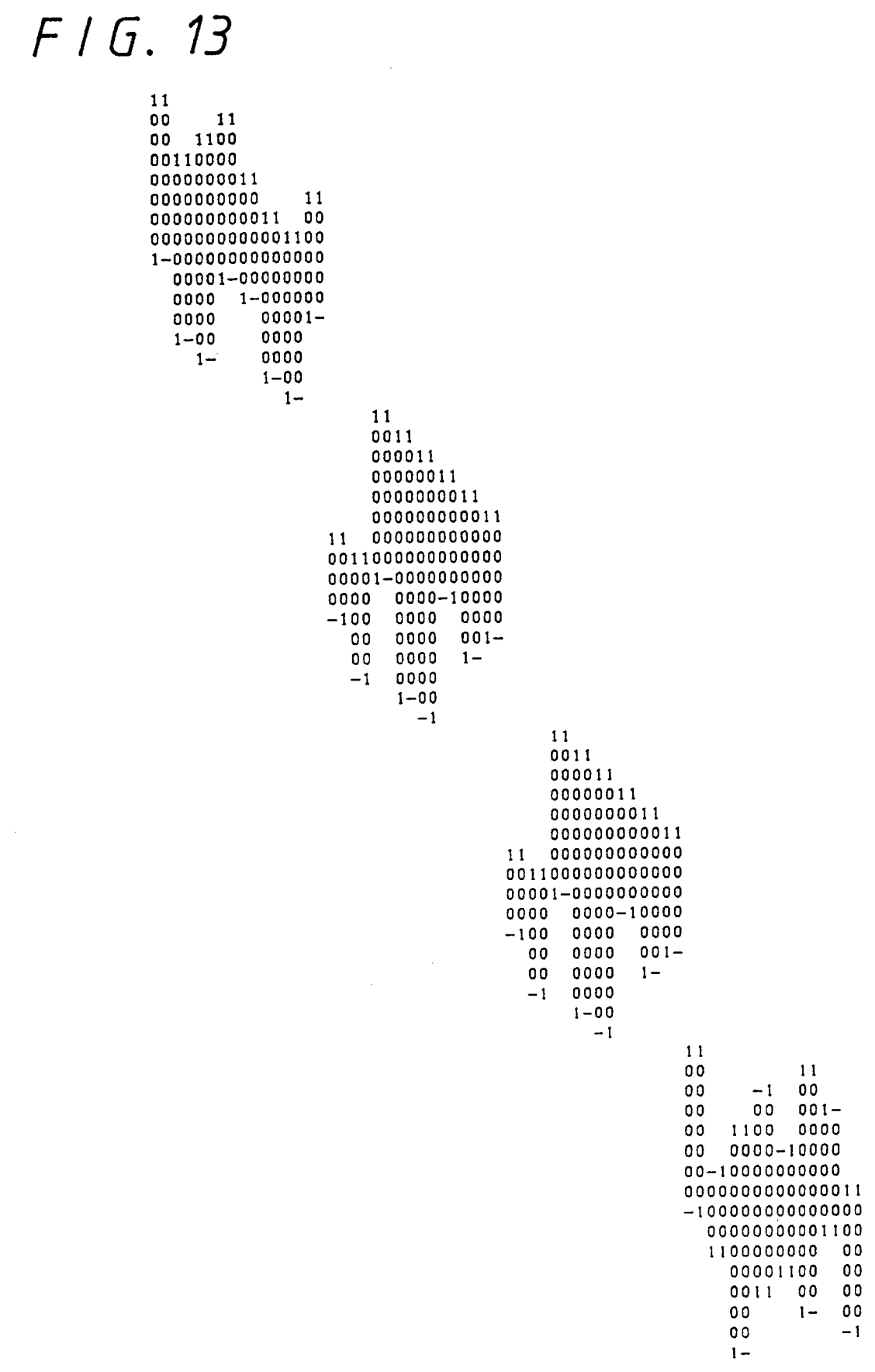
Figure 14:
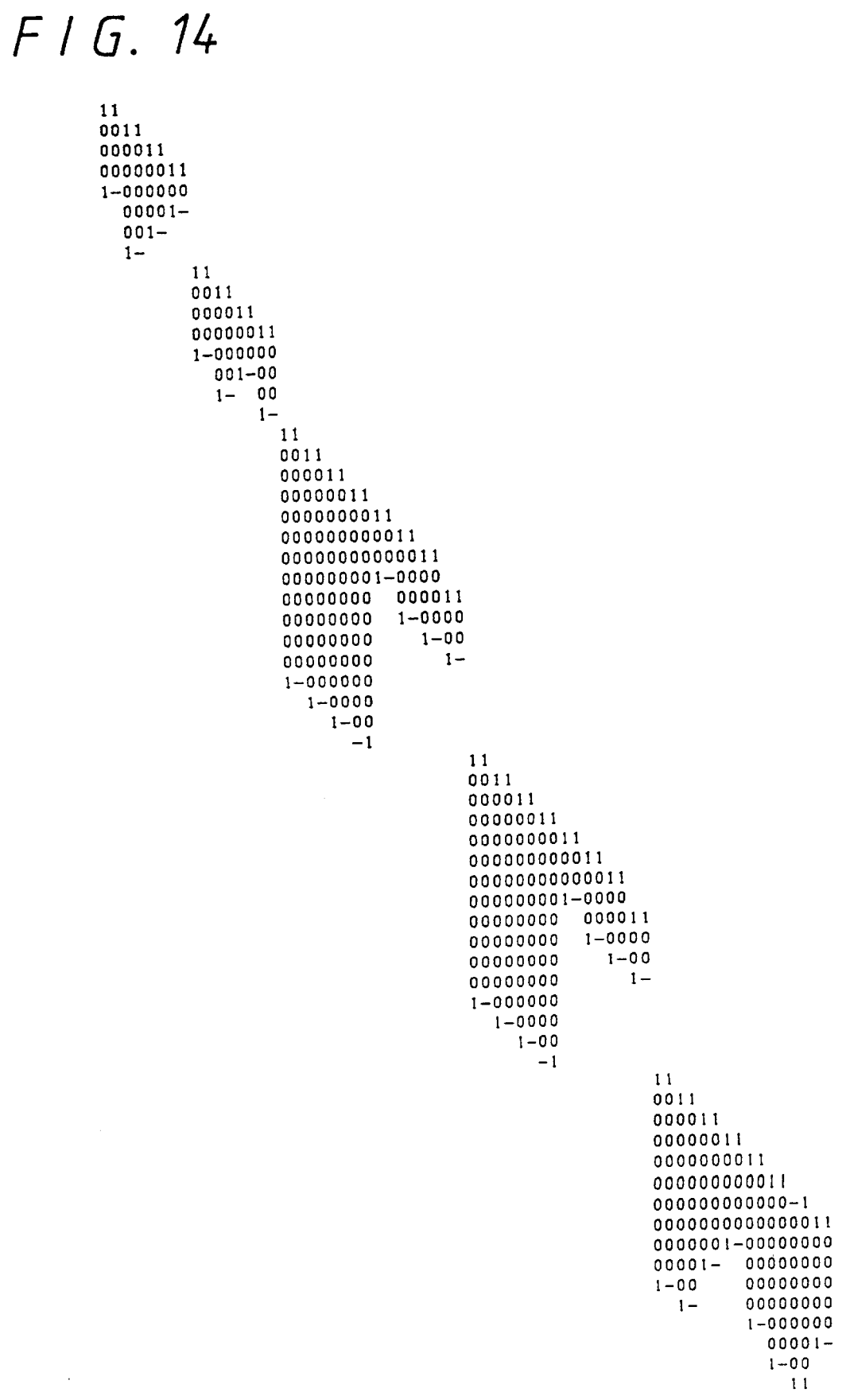
Figure 15:
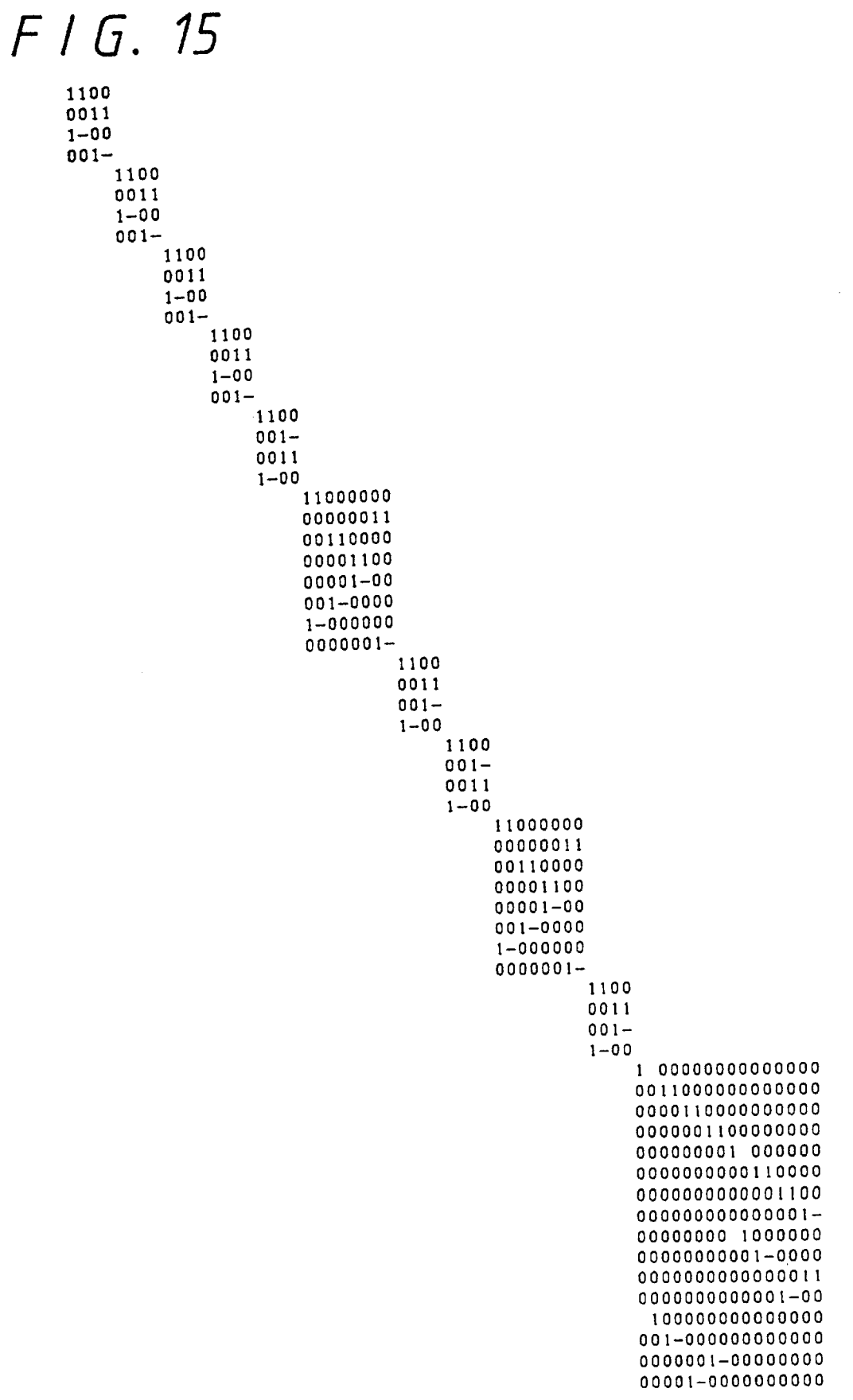

The principles of a first embodiment of the present invention are based on the fact that the 64×64 constant matrix [TS] shown in FIG. 4 can be resolved into three matrices, e.g., a 64×64 constant matrix [TSC] shown in FIG. 13, a 64×64 constant matrix [TSB] shown in FIG. 14, and a 64×64 constant matrix [TSA] shown in FIG. 15, i.e., $$[TS]=[TSA]\cdot[TSB]\cdot[TSC].$$

The elements of the constant matrix [TSA], the constant matrix [TSB], and the constant matrix [TSC] have coefficients that are 0, +1, and −1. Each row or column of these matrices contains two or less elements whose coefficients are not 0. No calculations are effected on those elements whose coefficient is 0. Those elements whose coefficient is +1 can be calculated by way of additions. Those elements whose coefficient is −1 can be calculated by way of subtractions. Therefore, the matrices can be calculated by circuit arrangements shown in FIGS. 10, 11, and 12.

Figure 10:
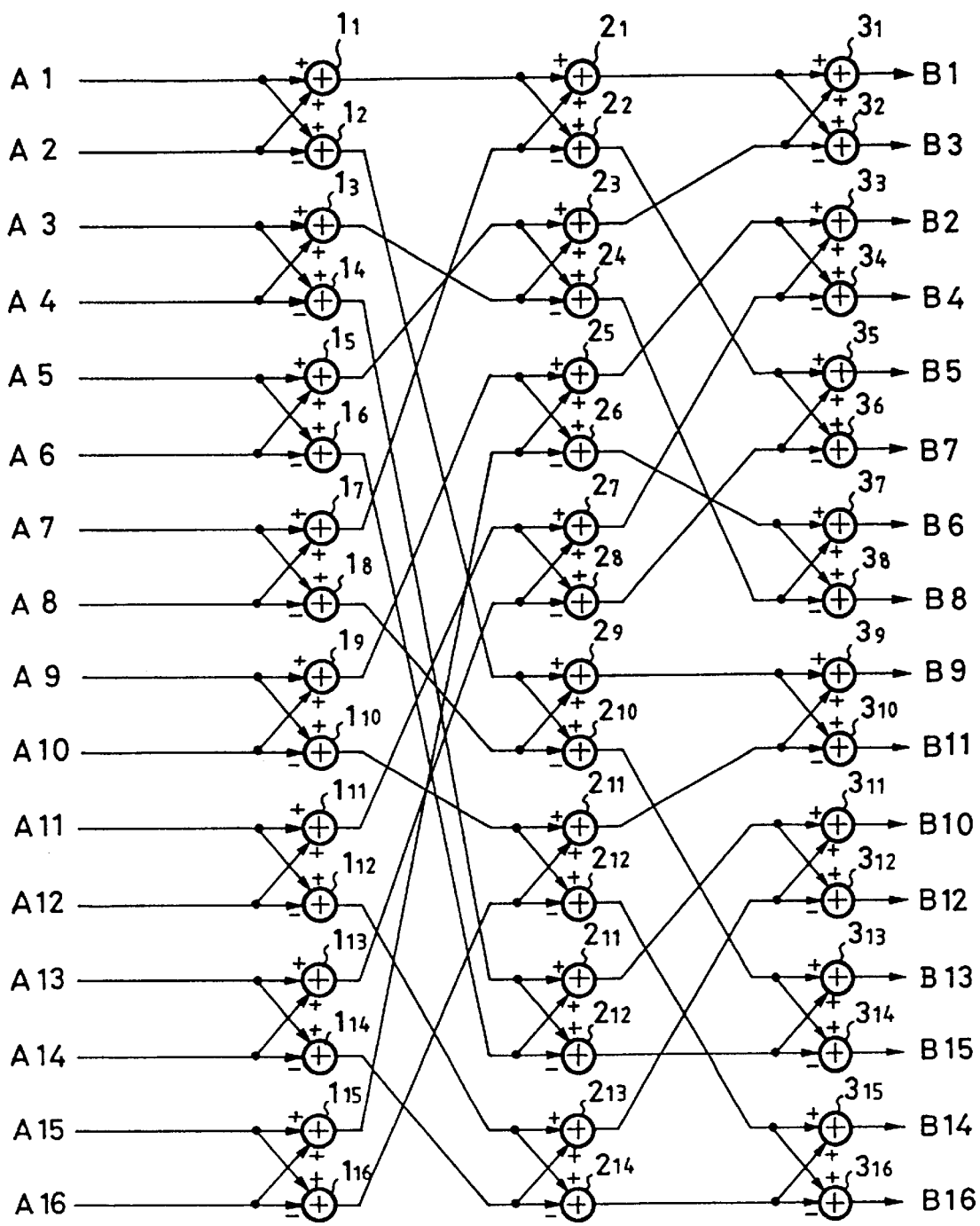
FIG. 10 is a diagram of a portion of a matrix data multiplying apparatus according to a first embodiment of the present invention.
Figure 11:
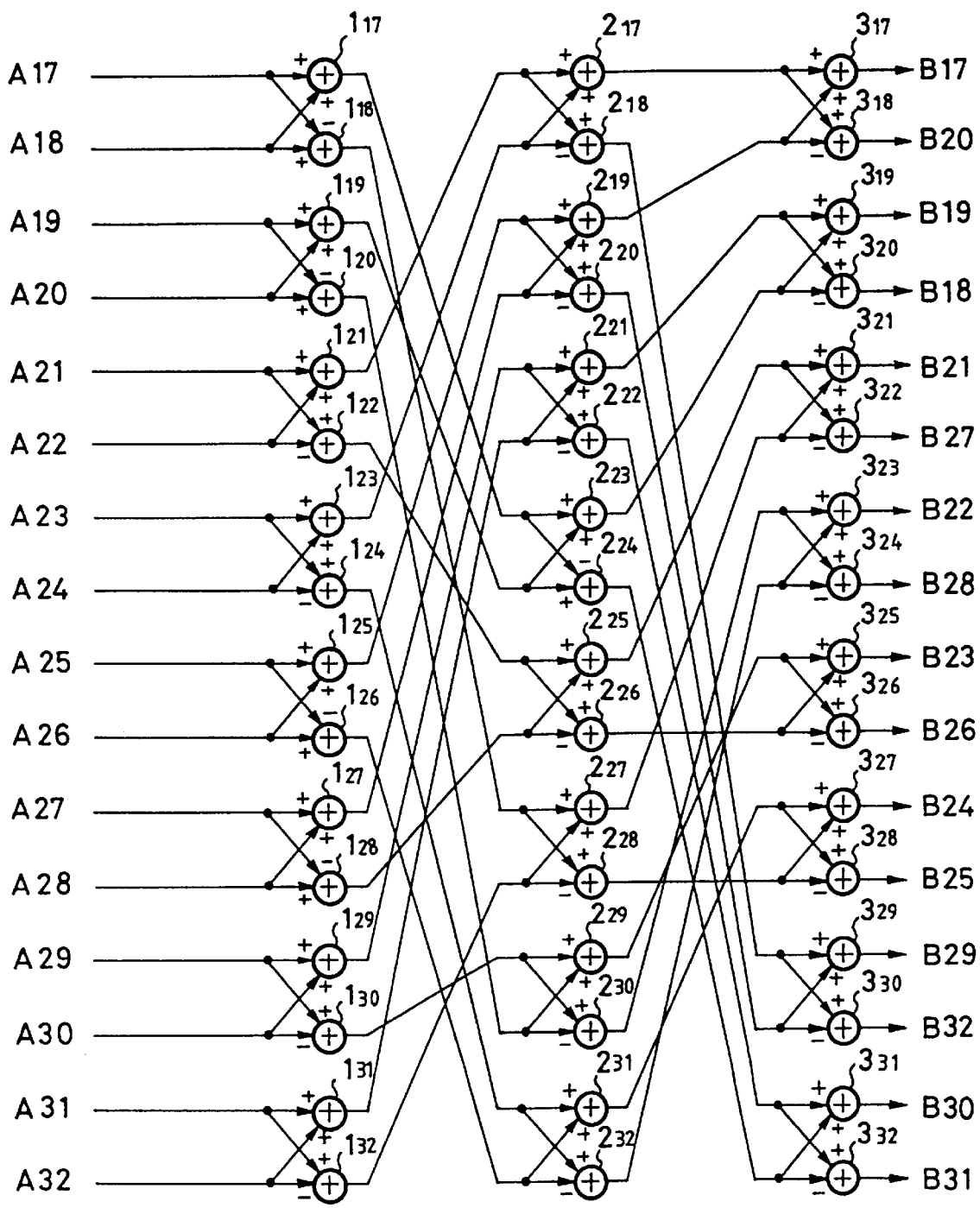
FIG. 11 is a diagram of another portion of the matrix data multiplying apparatus according to the first embodiment of the present invention.
Figure 12:
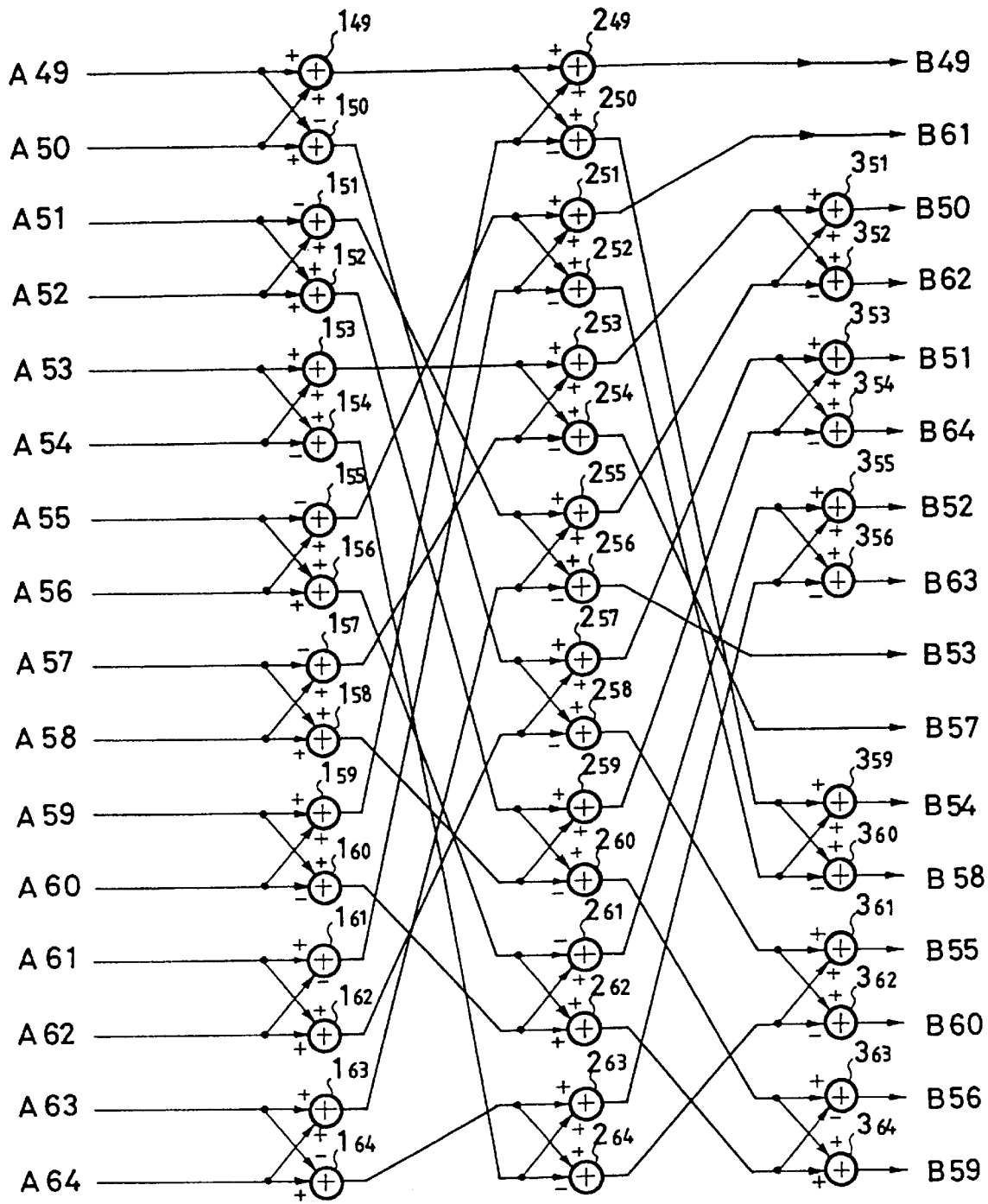
FIG. 12 is a diagram of still another portion of the matrix data multiplying apparatus according to the first embodiment of the present invention.

FIGS. 10, 11, and 12 show a matrix data multiplying apparatus according to the first embodiment of the present invention.

As shown in FIG. 10, 1st~16th rows of the constant matrix [TSC] are calculated by a first stage of additions/subtractions (adders/subtractors $1_1$~$1_{16}$) to which elements A1~A16 are inputted. 1st~16th rows of the constant matrix

[TSB] are calculated by a second stage of additions/subtractions (adders/subtractors $2_1$~$2_{16}$) to which outputs from the first stage of additions/subtractions are inputted in a predetermined pattern as shown. 1st~16th rows of the constant matrix [TSA] are calculated by a third stage of additions/subtractions (adders/subtractors $3_1$~$3_{16}$) to which outputs from the second stage of additions/subtractions are inputted in a predetermined pattern as shown. As a result, 1st~16th rows of the constant matrix [TS] are calculated by the first through third stages of additions/subtractions, outputting elements B1~B16.

The number of additions/subtractions in FIG. 10 is 48.

As shown in FIG. 11, 17th~32nd rows of the constant matrix [TSC] are calculated by a first stage of additions/subtractions (adders/subtractors $1_{17}$~$1_{32}$) to which elements A17~A32 are inputted. 17th~32nd rows of the constant matrix [TSB] are calculated by a second stage of additions/subtractions (adders/subtractors $2_{17}$~$2_{32}$) to which outputs from the first stage of additions/subtractions are inputted in a predetermined pattern as shown. 17th~32nd rows of the constant matrix [TSA] are calculated by a third stage of additions/subtractions (adders/subtractors $3_{17}$~$3_{32}$) to which outputs from the second stage of additions/subtractions are inputted in a predetermined pattern as shown. As a result, 17th~32nd rows of the constant matrix [TS] are calculated by the first through third stages of additions/subtractions, outputting elements B17~B32.

The number of additions/subtractions in FIG. 11 is 48.

The calculations of 33rd~48th rows of the constant matrix [TS] will not be described in detail below as they are exactly the same as the 17th~32nd rows of the constant matrix [TS] because the elements of the 17th~32nd rows of each of the constant matrix [TSA], the constant matrix [TSB], and the constant matrix [TSC] are the same as the elements (A33~A48, B33~B48) of the 33rd~48th rows thereof.

As shown in FIG. 12, 49th~64th rows of the constant matrix [TSC] are calculated by a first stage of additions/subtractions (adders/subtractors $1_{49}$~$1_{64}$) to which elements A49~A64 are inputted. 49th~64th rows of the constant matrix [TSB] are calculated by a second stage of additions/subtractions (adders/subtractors $2_{49}$~$2_{64}$) to which outputs from the first stage of additions/subtractions are inputted in a predetermined pattern as shown. 49th~64th rows of the constant matrix [TSA] are calculated by a third stage of additions/subtractions (adders/subtractors $3_{51}$~$3_{56}$ and $3_{59}$~$3_{64}$) to which outputs from the second stage of additions/subtractions are inputted in a predetermined pattern as shown. As a result, 49th~64th rows of the constant matrix [TS] are calculated by the first through third stages of additions/subtractions, outputting elements B49~B64.

The number of additions/subtractions in FIG. 12 is 44.

The total number of additions/subtractions required to calculate the 64×64 constant matrix [TS] is 48+48+48+44= 188. Accordingly, the amount of computation is reduced because the calculation of the constant matrix [TS] can be carried out by only 188 additions/subtractions according to the present invention whereas 512 additions/subtractions have heretofore been required.

The principles of a second embodiment of the present invention are based on the fact that a 64×64 constant matrix t [TS] can be resolved into three matrices, e.g., a 64×64 constant matrix t [TSA], a 64×64 constant matrix t [TSB], and a 64×64 constant matrix t [TSC], i.e., $$t[TS]=t[TSC] \cdot t[TSB] \cdot t[TSA]$$

where t [TS], t [TSA], t [TSB], t [TSC] are transposed matrices of [TS], [TSA], [TSB], [TSC], respectively.

The elements of the constant matrix t [TSA], the constant matrix t [TSB], and the constant matrix t [TSC] have coefficients that are 0, +1, and −1. Each row or column of these matrices contains two or less elements whose coefficients are not 0. No calculations are effected on those elements whose coefficient is 0. Those elements whose coefficient is +1 can be calculated by way of additions. Those elements whose coefficient is −1 can be calculated by way of subtractions. Therefore, the matrices can be calculated by circuit arrangements shown in FIGS. 16, 17, and 18.

Figure 16:
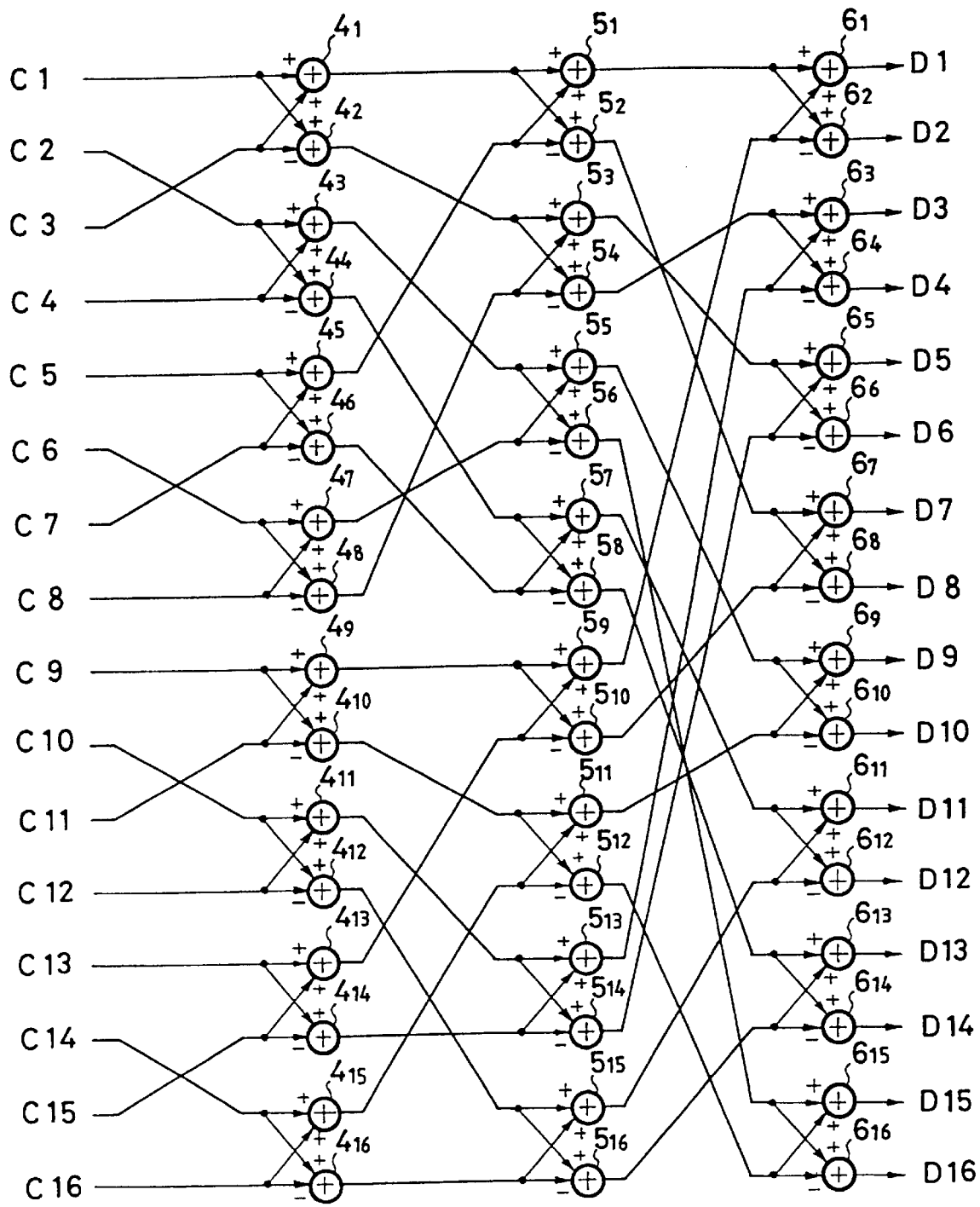
FIG. 16 is a diagram of a portion of a matrix data multiplying apparatus according to a second embodiment of the present invention.
Figure 17:
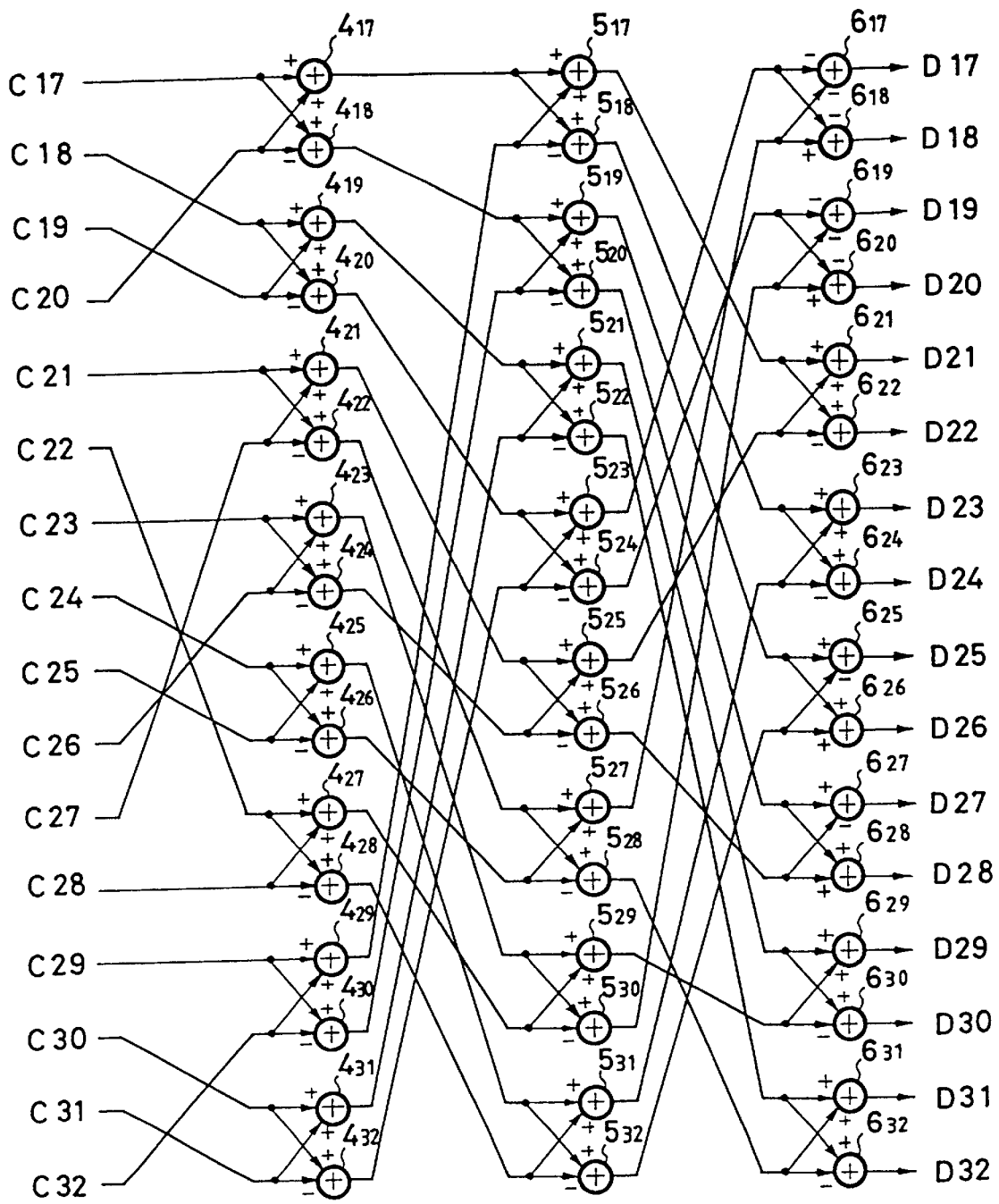
FIG. 17 is a diagram of another portion of the matrix data multiplying apparatus according to the second embodiment of the present invention.
Figure 18:
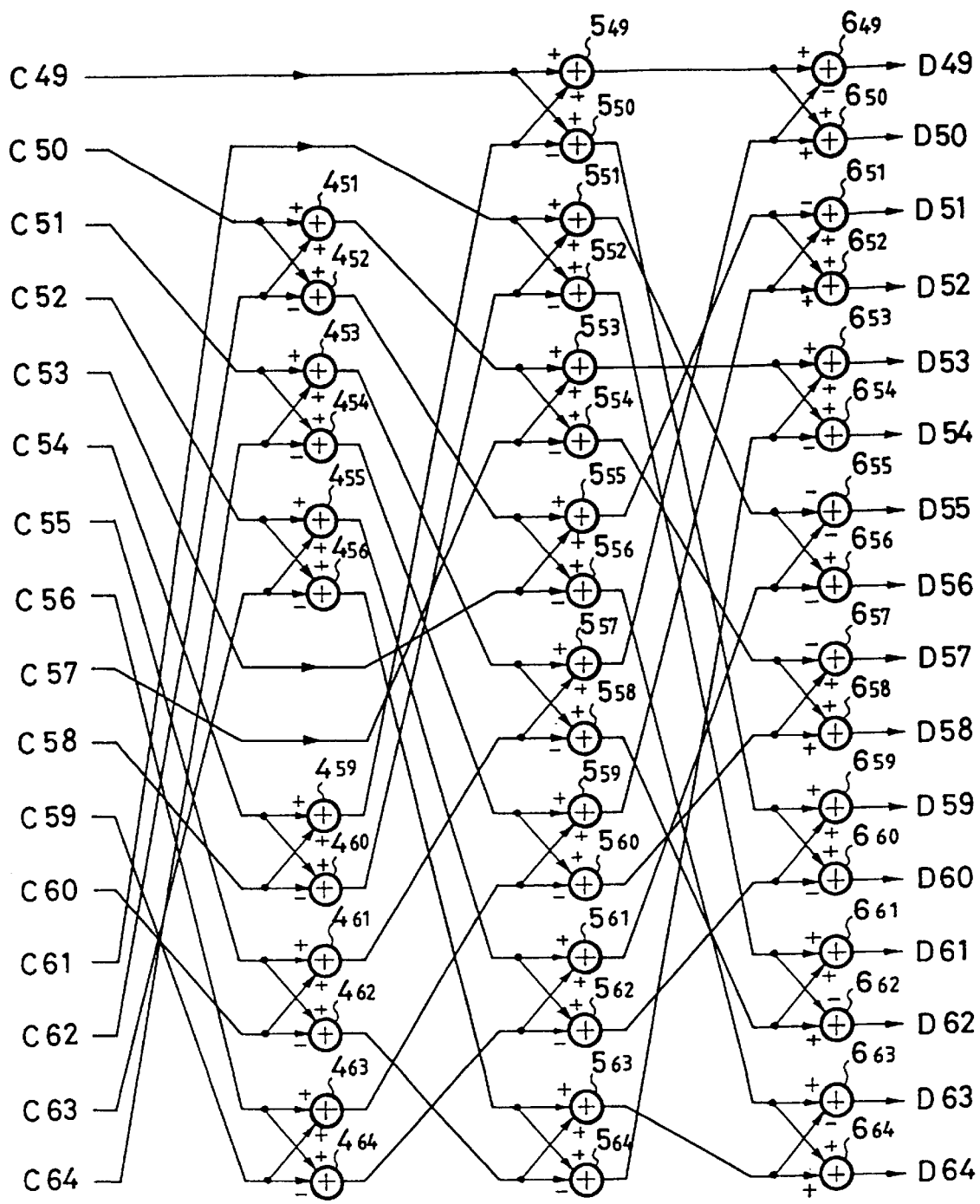
FIG. 18 is a diagram of still another portion of the matrix data multiplying apparatus according to the second embodiment of the present invention.

FIGS. 16, 17, and 18 show a matrix data multiplying apparatus according to the second embodiment of the present invention.

As shown in FIG. 16, 1st~16th rows of the constant matrix t [TSA] are calculated by a first stage of additions/subtractions (adders/subtractors $4_1$~$4_{16}$) to which elements C1~C16 are inputted. 1st~16th rows of the constant matrix t [TSB] are calculated by a second stage of additions/subtractions (adders/subtractors $5_1$~$5_{16}$) to which outputs from the first stage of additions/subtractions are inputted in a predetermined pattern as shown. 1st~16th rows of the constant matrix t [TSC] are calculated by a third stage of additions/subtractions (adders/subtractors $6_1$~$6_{16}$) to which outputs from the second stage of additions/subtractions are inputted in a predetermined pattern as shown. As a result, 1st~16th rows of the constant matrix t [TS] are calculated by the first through third stages of additions/subtractions, outputting elements D1~D16.

The number of additions/subtractions in FIG. 16 is 48.

As shown in FIG. 17, 17th~32nd rows of the constant matrix t [TSA] are calculated by a first stage of additions/subtractions (adders/subtractors $4_{17}$~$4_{32}$) to which elements C17~C32 are inputted. 17th~32nd rows of the constant matrix t [TSB] are calculated by a second stage of additions/subtractions (adders/subtractors $5_{17}$~$5_{32}$) to which outputs from the first stage of additions/subtractions are inputted in a predetermined pattern as shown. 17th~32nd rows of the constant matrix t [TSC] are calculated by a third stage of additions/subtractions (adders/subtractors $6_{17}$~$6_{32}$) to which outputs from the second stage of additions/subtractions are inputted in a predetermined pattern as shown. As a result, 17th~32nd rows of the constant matrix t [TS] are calculated by the first through third stages of additions/subtractions, outputting elements D17~D32.

The number of additions/subtractions in FIG. 17 is 48.

The calculations of 33rd~48th rows of the constant matrix t [TS] will not be described in detail below as they are exactly the same as the 17th~32nd rows of the constant matrix t [TS] because the elements of the 17th~32nd rows of each of the constant matrix t [TSA], the constant matrix t [TSB], and the constant matrix t [TSC] are the same as the elements (C33~C48, D33~D48) of the 33rd~48th rows thereof.

As shown in FIG. 18, 49th~64th rows of the constant matrix t [TSA] are calculated by a first stage of additions/subtractions (adders/subtractors $4_{51}$~$4_{56}$~$4_{64}$) to which elements C49~C64 are inputted. 49th~64th rows of the constant matrix t [TSB] are calculated by a second stage of additions/subtractions (adders/subtractors $5_{49}$~$5_{64}$) to which outputs from the first stage of additions/subtractions are inputted in a predetermined pattern as shown. 49th~64th rows of the constant matrix t [TSC] are calculated by a third stage of additions/subtractions (adders/subtractors $6_{49}$~$6_{64}$) to which outputs from the second stage of additions/subtractions are inputted in a predetermined pattern as shown. As a result, 49th~64th rows of the constant matrix t

[TS] are calculated by the first through third stages of additions/subtractions, outputting elements D49~D64.

The number of additions/subtractions in FIG. 18 is 44.

The total number of additions/subtractions required to calculate the 64×64 constant matrix t [TS] is 48+48+48+44=188. Accordingly, the amount of computation is reduced because the calculation of the constant matrix t [TS] can be carried out by only 188 additions/subtractions according to the present invention whereas 512 additions/subtractions have heretofore been required.

Figure 2:
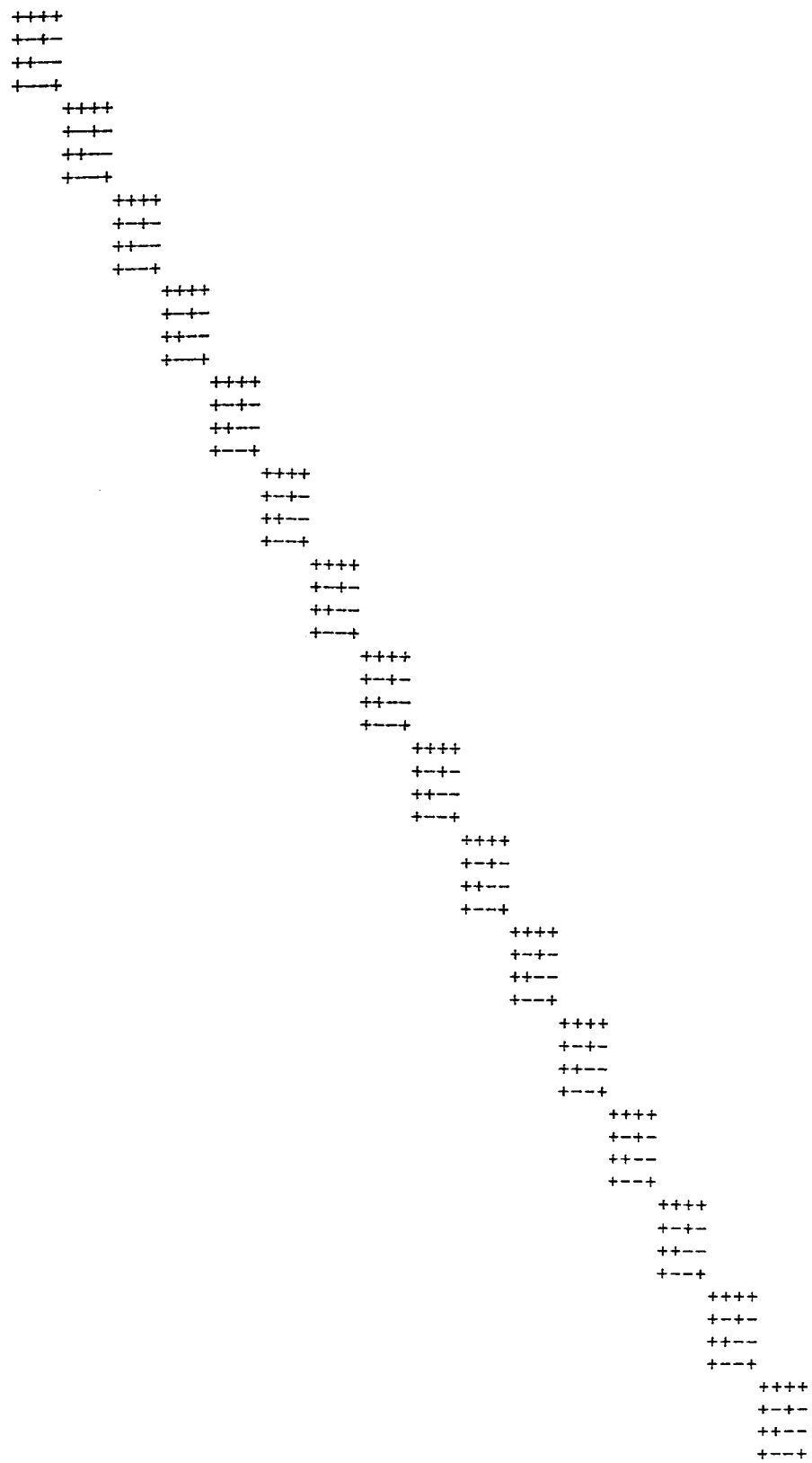
FIG. 2 is a diagram of a constant matrix [L] for calculating a two-dimensional 8×8 DCT.
Figure 7:
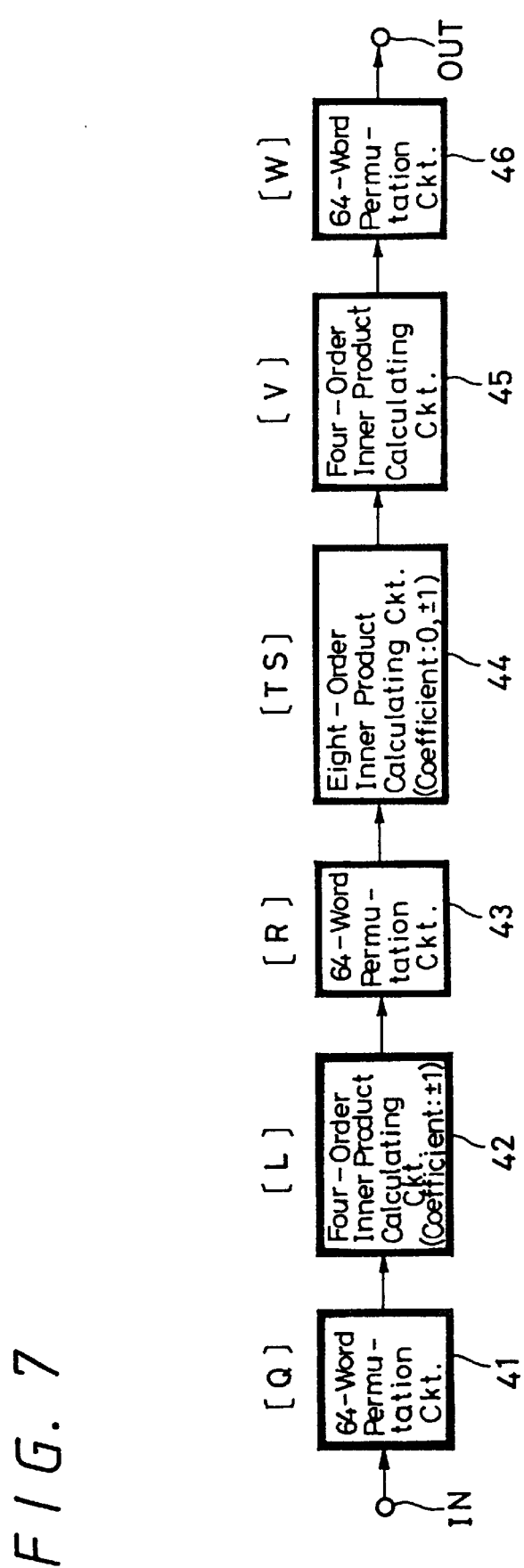
FIG. 7 is a block diagram of a circuit arrangement for computing a two-dimensional 8×8 DCT.
Figure 9:
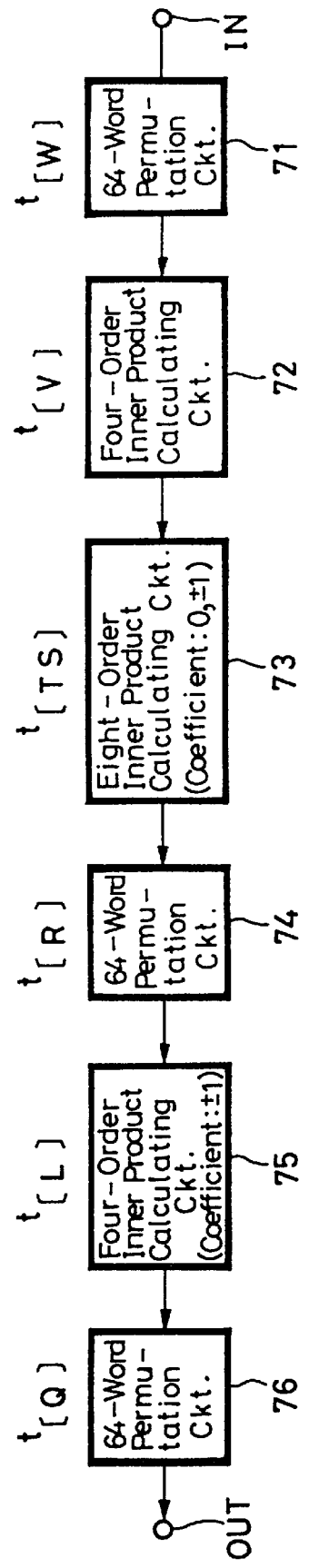
FIG. 9 is a block diagram of a circuit arrangement for computing a two-dimensional 8×8 IDCT.
Figure 20:
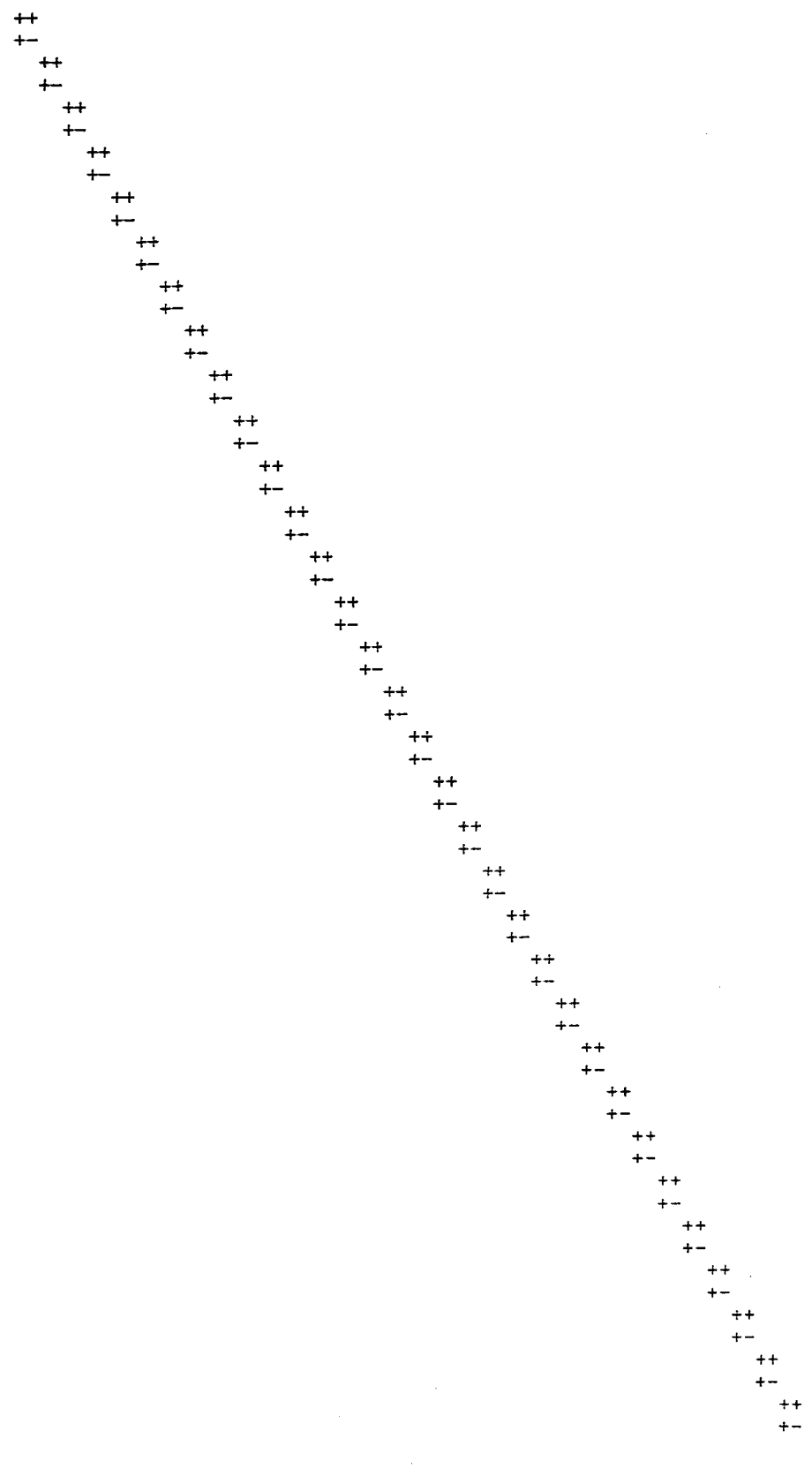
Figure 21:
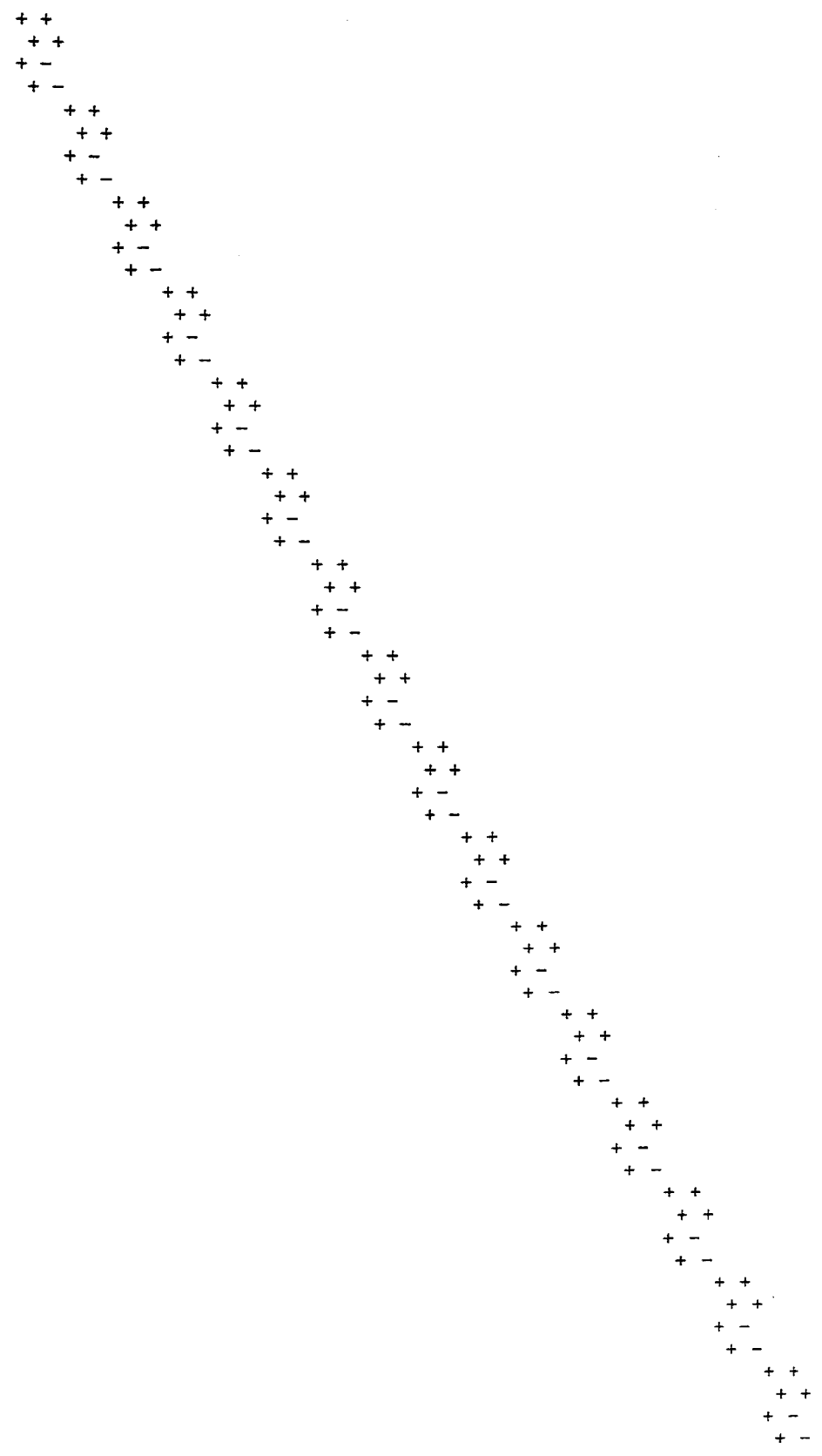

The principles of a third embodiment of the present invention are based on the fact that the 64×64 constant matrix [L] shown in FIG. 2 can be resolved into two matrices, e.g., a 64×64 constant matrix [LB] shown in FIG. 20 and a 64×64 constant matrix [LA] shown in FIG. 21, i.e., $$[L]=[LA]\cdot[LB].$$

The elements of the constant matrix [LA] and the constant matrix [LB] have coefficients that are 0, +1, and −1. Each row or column of these matrices contains two elements whose coefficients are not 0. No calculations are effected on those elements whose coefficient is 0. Those elements whose coefficient is +1 can be calculated by way of additions. Those elements whose coefficient is −1 can be calculated by way of subtractions. Therefore, the matrices can be calculated by a circuit arrangement shown in FIG. 19.

Figure 19:
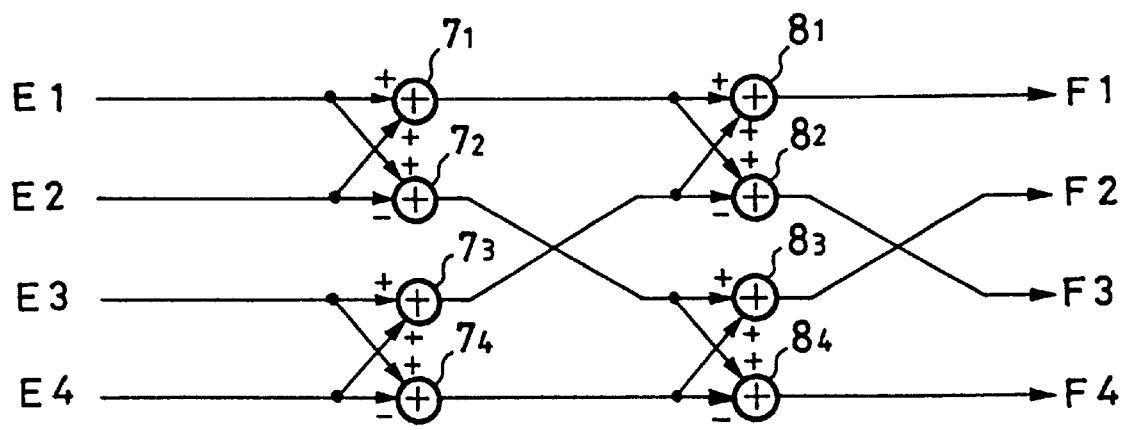
FIG. 19 is a diagram of a portion of a matrix data multiplying apparatus according to a third embodiment of the present invention.

FIG. 19 shows a matrix data multiplying apparatus according to the third embodiment of the present invention.

As shown in FIG. 19, 1st~4th rows of the constant matrix [LB] are calculated by a first stage of additions/subtractions (adders/subtractors $7_1$~$7_4$) to which elements E1~E4 are inputted. 1st~4th rows of the constant matrix [LA] are calculated by a second stage of additions/subtractions (adders/subtractors $8_1$~$8_4$) to which outputs from the first stage of additions/subtractions are inputted in a predetermined pattern as shown. As a result, 1st~4th rows of the constant matrix [L] are calculated by the first and second stages of additions/subtractions, outputting elements F1~F4.

The number of additions/subtractions in FIG. 19 is 8.

The calculations of (4m+1)th~(4m+4)th rows (m=1, 2, ..., 15) of the constant matrix [L] will not be described in detail below as they are exactly the same as the 1st~4th rows of the constant matrix [L] as shown in FIG. 19 because the elements of the 1st~4th rows of each of the constant matrix [L], the constant matrix [LA], and the constant matrix [LB] are the same as the elements (E4m+1~E4m+4, F4m+1~F4m+4) of the (4m+1)th~(4m+4)th rows thereof.

The total number of additions/subtractions required to calculate the 64×64 constant matrix [L] is 8×16=128. Accordingly, the amount of computation is reduced because the calculation of the constant matrix [L] can be carried out by only 128 additions/subtractions according to the present invention whereas 256 additions/subtractions have heretofore been required.

With the present invention, the circuit arrangement which resolves the 64×64 constant matrix [TS] into three matrices each composed of elements having coefficients 0, +1, and −1 and effects calculations on the elements of those matrices makes it possible to reduce the amount of computation so as to be less than 512 additions/subtractions. The circuit arrangement which resolves the 64×64 constant matrix t [TS] into three matrices each composed of elements having coefficients 0, +1, and −1 and effects calculations on the elements of those matrices also makes it possible to reduce the amount of computation so as to be less than 512 additions/subtractions. Furthermore, the circuit arrangement which resolves the 64×64 constant matrix [L] into two matrices each composed of elements having coefficients 0, +1, and −1 and effects calculations on the elements of those matrices makes it is possible to reduce the amount of computation so as to be less than 256 additions/subtractions.

Although certain preferred embodiments of the present invention has been shown and described in detail, it should be understood that various changes and modifications may be made therein without departing from the scope of the appended claims.

What is claimed is:

1. A method of multiplying matrix data comprising the steps of:
   (a) inputting an image signal to a matrix multiplying circuit,
   (b) multiplying said image signal by a first constant matrix with said matrix multiplying circuit, and
   (c) outputting from said matrix multiplying circuit the result of the multiplying step (b) as an output vector signal,
   wherein said multiplying by a constant matrix step (b) includes:
   (b)(1) resolving with said matrix multiplying circuit said first constant matrix into a first group of constant matrices;
   (b)(2) further resolving with said matrix multiplying circuit one matrix of said first group of constant matrices into at least three finally-resolved constant matrices, each finally-resolved constant matrix being composed of elements selected from the following group 0, +1, and −1; and
   (b)(3) multiplying said input vector signal with said one matrix, said one matrix being resolved to each finally-resolved constant matrix, in stages by performing adding and subtracting steps with an adding/subtracting circuit.

2. A method according to claim 1, wherein said adding and subtracting steps calculate inner products.

3. A method according to claim 1, wherein said input vector signal comprises an image signal and said first constant matrix comprises a constant matrix M resolved by said resolving step (b)(1) into a first group of constant matrices W, V, TS, R, L, and Q such that said multiplying step (b) linearly transforms said image signal from real space to frequency space by discrete cosine transform; and said further resolving step (b)(2) resolves said constant matrix TS into three finally-resolved constant matrices TSA, TSB, and TSC each composed of elements selected from the following group 0, +1, and −1.

4. A method according to claim 3, wherein said further resolving step (b)(2) further resolves said constant matrix L into two finally-resolved constant matrices LA, LB, each composed of elements selected from the following group 0, +1, and −1.

5. A method according to claim 3, wherein the input vector signal has 64 elements corresponding to an 8×8 image signal picture matrix and constant matrix [TX] is an 64 ×64 square matrix; and the total combined addition and subtraction operations to carry out the multiplication of the finally-resolved constant matrices [TSA], [TSB], [TSC] in step (b)(2) is less than 512 combined additions or subtractions.

6. A method accord ing to claim 5, wherein said further resolving step (b)(2) comprises 64 total additions and subtractions at a first stage carrying out the multiplication by [TSC], 64 total additions and subtractions at a second stage carrying out the multiplication of [TSB], and 60 total additions and subtractions at a third stage carrying out the multiplication by [TSA].

7. A method according to claim 1, wherein each of said finally-resolved constant matrices has two or less elements which are not 0 in each row and each column.

8. A method according to claim 1, wherein said input vector signal comprises an image signal and said first constant matrix comprises an inverse constant matrix IM resolved by said revolving step (b)(1) into a first group of constant transposed matrices tQ, tL, tR, tTS, tV, and tW such that said multiplying step (b) linearly transforms said image signal from frequency space to real space by inverse discrete cosine transform; and said further resolving step (b)(2) resolves said constant matrix tTS into three finally-resolved constant transposed matrices tTSA, tTSB, and tTSC, each finally-resolved constant transposed matrix being composed of elements selected from the following group 0, +1, and −1.

9. The method according to claim 1, wherein said one matrix of said first group of constant matrices and said finally-resolved matrices are square and each have the same order.

10. The method as set forth in claim 1, wherein said step of inputting said image signal comprises a step of inputting an image signal and said step of outputting the result of the multiplying step comprises a step of outputting a linear transformation of said image signal from real space to frequency space by discrete cosine transform.

11. The method as set forth in claim 1, wherein said step of inputting said image signal comprises a step of inputting an image signal and said step of outputting the result of the multiplying step comprises a step of outputting a linear transformation of said image signal from frequency space to real space by inverse discrete cosine transform.

* * * * *

UNITED STATES PATENT AND TRADEMARK OFFICE
CERTIFICATE OF CORRECTION

PATENT NO. : 6,006,246
DATED : December 21, 1999
INVENTOR(S) : Mitsuharu Ohki

It is certified that error appears in the above-identified patent and that said Letters Patent is hereby corrected as shown below:

Column 10,
Line 38, should read :

3. A method according to claim 1, wherein said input vector signal comprises an image signal and said first constant matrix comprises a constant matrix [M] resolved by said resolving step (b) (1) into a first group of constant matrices [W], [V], [TS], [R], [L], and [Q] such that said multiplying step (b) linearly transforms said image signal from real space to frequency space by discrete cosine transform; and said further resolving step (b) (2) resolves said constant matrix [TS] into three finally-resolved constant matrices [TSA], [TSB], and [TSC] each composed of elements selected from the following group 0, + 1, and - 1.

Line 49, should read:

4. A method according to claim 3, wherein said further resolving step (b) (2) further resolves said constant matrix [L] into two finally-resolved constant matrices [LA], [LB], each composed of elements selected from the following group 0, +1, and - 1.

UNITED STATES PATENT AND TRADEMARK OFFICE
CERTIFICATE OF CORRECTION

PATENT NO. : 6,006,246
DATED : December 21, 1999
INVENTOR(S) : Mitsuharu Ohki

It is certified that error appears in the above-identified patent and that said Letters Patent is hereby corrected as shown below:

Column 11,
Line 4, should read:

8. A method according to claim 1, wherein said input vector signal comprises an image signal and said first constant matrix comprises an inverse constant matrix [IM] resolved by said resolving step (b) (1) into a first group of constant transposed matrices t[Q], t[L], t[R], t[TS], t[V], and t[W] such that said multiplying step (b) linearly transforms said image signal from frequency space to real space by inverse discrete cosine transform; and said further resolving step (b) (2) resolves said constant matrix t[TS] into three finally-resolved constant transposed matrices t[TSA], t[TSB], and t[TSC], each finally-resolved constant transposed matrix being composed of elements selected from the following group 0, +1, and -1.

Signed and Sealed this

Thirtieth Day of April, 2002

*Attest:*

*Attesting Officer*

JAMES E. ROGAN
*Director of the United States Patent and Trademark Office*